US012599790B2

(12) United States Patent
Wang et al.

(10) Patent No.: US 12,599,790 B2
(45) Date of Patent: Apr. 14, 2026

(54) RELIEF APPARATUS AND METHOD OF USING THE SAME

(71) Applicant: HONEYWELL SAFETY PRODUCTS USA, INC., Charlotte, NC (US)

(72) Inventors: Wenbo Wang, Shanghai (CN); Ling Lin, Shanghai (CN); Xiaojuan Zhu, Shanghai (CN); Zheng Gu, Shanghai (CN); Lyndon Liu, Shanghai (CN); Zhou Weiming, Shanghai (CN); Peng Zhou, Shanghai (CN)

(73) Assignee: HONEYWELL SAFETY PRODUCTS USA, INC., Charlotte, NC (US)

( * ) Notice: Subject to any disclaimer, the term of this patent is extended or adjusted under 35 U.S.C. 154(b) by 1184 days.

(21) Appl. No.: 17/463,173

(22) Filed: Aug. 31, 2021

(65) Prior Publication Data

US 2023/0025031 A1 Jan. 26, 2023

(30) Foreign Application Priority Data

Jul. 23, 2021 (CN) ........................ 202110836539.0

(51) Int. Cl.
*A62B 35/00* (2006.01)

(52) U.S. Cl.
CPC ...... *A62B 35/0025* (2013.01); *A62B 35/0018* (2013.01)

(58) Field of Classification Search
CPC ............ A62B 35/0006; A62B 35/0025; A62B 35/0018; A62B 35/0031; A62B 35/0037; A62B 35/04; A62B 35/0075; A62B 35/0093; A62B 35/00; E05B 67/383
See application file for complete search history.

(56) References Cited

U.S. PATENT DOCUMENTS 2,963,895 A * 12/1960 Thomas ................ E05B 67/383 292/288
5,174,410 A * 12/1992 Casebolt ................ F16F 7/006 188/371

(Continued)

OTHER PUBLICATIONS

European search report Mailed on Feb. 3, 2022 for EP Application No. 21194597.

*Primary Examiner* — Abe Massad
(74) *Attorney, Agent, or Firm* — Fredrikson & Byron, P.A.

(57) ABSTRACT

Various embodiments are directed to relief apparatuses and methods of using the same. In various embodiments, a relief apparatus may comprise a housing comprising an interior housing portion configured to store a relief step device therein, and an activation assembly configured to facilitate an automated deployment of the relief step device from within the interior housing portion in response to a fall occurrence, wherein the automated deployment of the at least a portion of the relief step device is based at least in part on a load force acting on at least a portion of the activation assembly, wherein the load force is defined at least in part by a force generated as a result of the fall occurrence. In various embodiments, a relief apparatus may comprise an activation assembly that enables both an automated deployment and a manual deployment of a relief step device in a fall condition.

19 Claims, 6 Drawing Sheets

(56) References Cited

U.S. PATENT DOCUMENTS

| | | | | |
|---|---|---|---|---|
| 6,393,677 | B1 * | 5/2002 | Anscher | A44B 11/2549 24/615 |
| 11,577,104 | B2 * | 2/2023 | Wolner | A62B 35/0018 |
| 2005/0194211 | A1 | 9/2005 | O'Shall et al. | |
| 2005/0230184 | A1 * | 10/2005 | Ansaldo | A62B 1/16 182/3 |
| 2008/0060872 | A1 | 3/2008 | Wise | |
| 2009/0255756 | A1 | 10/2009 | Green | |
| 2020/0360739 | A1 * | 11/2020 | Truesdell | A44B 13/0029 |
| 2023/0022288 | A1 * | 1/2023 | Zhu | F16G 11/00 |
| 2023/0330456 | A1 * | 10/2023 | Aleksovski | A62B 35/0018 |

* cited by examiner

RELIEF APPARATUS AND METHOD OF USING THE SAME

CROSS-REFERENCE TO RELATED APPLICATIONS

This application claims priority from Chinese Application Number 202110836539.0, filed on Jul. 23, 2021, and entitled "Relief Apparatus And Method Of Using The Same," which is incorporated herein by reference in its entirety.

FIELD OF THE INVENTION

Various embodiments described herein relate generally to safety equipment or personal protective equipment (PPE), including full body harnesses, which may be used by first responders, other users who work on platforms situated at a height, and/or the like.

BACKGROUND

Safety harnesses are commonly used as part of a fall protection system for users subjected to the potential of a fall from a height. In some environments, full-body safety harnesses are required, in some examples, when working on platforms that are at a height of six feet or greater. Such harnesses typically include both an upper torso portion (having, for example, shoulder straps) and a lower torso or seat portion (having, for example, one or more leg straps and/or a seat strap). While working on such platforms or in such an environment, a worker using a harness (e.g., a user) may be required to move around, stand, squat or lean, and with such actions, the harness can become stiff and/or offer resistance to the movement. For example, different straps of the harness may intersect, tangle, rub, or otherwise hinder movement of a user.

Further, in the event of a fall, safety harnesses cause bodily harm to a user in the course of suspending the user. Such harm, or suspension trauma, includes the loss of circulation of blood in the legs of the user (e.g., due to constriction of the straps of the harness against the user's body, or otherwise understood as gravitational force compressing the user's body against straps of the harness). When uncorrected or unprevented, suspension trauma may lead to restriction of blood flow to the brain and other major organs, further resulting in unconsciousness, serious injury, and possibly death. Accordingly, there is a need in the art for increased mobility and flexibility in safety harnesses and for the mitigation or prevention of suspension trauma for a user when suspending in a harness.

BRIEF SUMMARY

Various embodiments are directed to a relief apparatus and method of using the same. In various embodiments, a relief apparatus may comprise a housing comprising an interior housing portion configured to store a relief step device therein, the housing being at least partially secured to a wearable safety harness; an activation assembly configured to facilitate an automated deployment of at least a portion of the relief step device from within the interior housing portion in response to a fall occurrence; wherein the automated deployment of the at least a portion of the relief step device is based at least in part on a load force acting on at least a portion of the activation assembly, wherein the load force is defined at least in part by a force generated as a result of the fall occurrence.

In various embodiments, the activation assembly may comprise: a fastener receiver component, the fastener receiver component being removably engaged relative to at least a portion of the housing; and a first fastener element removably coupled to the fastener receiver component; wherein the automated deployment of the at least a portion of the relief step device is based at least in part on the load force acting on a first portion of the activation assembly defined at least in part by the first fastener element. In certain embodiments, the activation assembly may further comprise: a first activation strap extending between a first strap end coupled to the first fastener element and a second strap end fixedly secured to an activation strap interface portion of the wearable safety harness; wherein the automated deployment of the at least a portion of the relief step device is facilitated by a first disengagement of the first fastener element relative to the fastener receiver component, wherein the first disengagement is caused at least in part by the load force acting on the first activation strap. In certain embodiments, the first disengagement of the first fastener element relative to the fastener receiver component may enable the housing to be configured in an at least substantially open configuration. Further, in certain embodiments, the first fastener element may be configurable between an engaged condition and a disengaged condition relative to the to the fastener receiver component, wherein the relief apparatus is configured such that the first fastener element arranged in the engaged condition is configured to at least partially restrict a range of relative motion between the fastener receiver component and the housing in a first lateral direction.

In various embodiments, the relief apparatus may further comprise a fastener interface element secured relative to the housing and configured to engage at least a portion of the activation assembly so as to at least partially define a range of relative motion between the fastener receiver component and the housing. In various embodiments, at least a portion of the activation assembly may be secured relative to a fall indicator strap portion provided within the wearable safety harness, the fall indicator strap portion being configured to transition from a first indicator state to a second indicator state in response to the fall occurrence; wherein the load force acting on the at least a portion of the activation assembly is based at least in part on the fall indicator strap portion transitioning from the first indicator state to the second indicator state.

In various embodiments, the activation assembly may be further configured to facilitate a manual deployment of the at least a portion of the relief step device from within the interior housing portion. In certain embodiments, the manual deployment of the at least a portion of the relief step device may be based at least in part on an applied force acting on a second portion of the activation assembly, wherein the applied force is defined at least in part by a user-generated force resulting from a user interaction with the relief apparatus. Further, in certain embodiments, the activation assembly may comprise: a fastener receiver component, the fastener receiver component being removably engaged relative to at least a portion of the housing; wherein the automated deployment of the at least a portion of the relief step device is based at least in part on the load force acting on a first portion of the activation assembly, wherein the first portion of the activation assembly comprises a first fastener element removably coupled to the fastener receiver component; and wherein the second portion of the activation assembly comprises a second fastener element removably coupled to the fastener receiver component.

In various embodiments, each of the first fastener element and the second fastener element may be configurable between a engaged condition and a disengaged condition relative to the first receiver portion and the second receiver portion, respectively; wherein the relief apparatus is configured such that the first fastener element is arranged in the engaged condition relative to the first receiver portion is configured to at least partially restrict a first range of relative motion between the fastener receiver component and the housing in a first lateral direction, and the second fastener element is arranged in the engaged condition relative to the second receiver portion is configured to at least partially restrict a second range of relative motion between the fastener receiver component and the housing in a second lateral direction. Further, in certain embodiments, the activation assembly may further comprise: a first activation strap extending between a first strap end coupled to the first fastener element and a second strap end fixedly secured to an activation strap interface portion of the wearable safety harness; a second activation strap coupled to the second fastener element; wherein the automated deployment of the at least a portion of the relief step device is facilitated by a first disengagement of the first fastener element relative to a first receiver portion of the fastener receiver component; and wherein the manual deployment of the at least a portion of the relief step device is facilitated by a second disengagement of the second fastener element relative to a second receiver portion of the fastener receiver component.

In various embodiments, the first disengagement may be caused at least in part by the load force acting on the first activation strap; and wherein the second disengagement is caused at least in part by a user-generated force resulting from a user interaction with the second activation strap. In various embodiments, the housing may define a closed configuration based at least in part on both the first fastener element and the second fastener element being arranged in respective engaged conditions relative to the fastener receiver component. In certain embodiments, one or more of the first disengagement of the first fastener element relative to the fastener receiver component and the second disengagement of the second fastener element relative to the fastener receiver component may enable the housing to be configured in an at least substantially open configuration.

In various embodiments, the relief apparatus may further comprise a fastener interface element secured relative to the housing and configured to engage at least a portion of the activation assembly so as to at least partially define a range of relative motion between the fastener receiver component and the housing. In certain embodiments, the fastener interface element may comprise a protrusion feature extending in an outward direction from an exterior surface of the housing; wherein the protrusion feature comprises an orifice extending therethrough and configured to receive at least a portion of the fastener receiving component therein such that the fastener receiving component extends within the orifice of the protrusion feature from a first side of the fastener interface element to a second side of the fastener interface element.

In various embodiments, the first fastener element may comprise a first male buckle and the second fastener element comprises a second male buckle; and wherein the first receiver portion of the fastener receiving component comprises a first female buckle element disposed about a first end of the fastener receiving component and configured to receive the first male buckle; and wherein the second receiver portion of the fastener receiving component comprises a second female buckle element disposed about a second end of the fastener receiving component and configured to receive the second male buckle. Further, in various embodiments, the relief apparatus may further comprise an activation assistance element operatively engaged with at least a portion of the housing and configured to apply one or more forces to the at least a portion of the housing engaged therewith so as to define a baseline housing configuration wherein the housing is predisposed to be arranged in an open configuration based at least in part on the one or more forces applied to the housing by the activation assistance element. Further, in various embodiments, the relief apparatus may further comprise one or more adjustable elements disposed along a length of the relief strap device and configured to facilitate a selective adjustment of the length of the relief strap device in the event of a fall occurrence.

BRIEF DESCRIPTION OF THE DRAWINGS

Reference will now be made to the accompanying drawings, which are not necessarily drawn to scale, and wherein.

DETAILED DESCRIPTION

Figure 1:
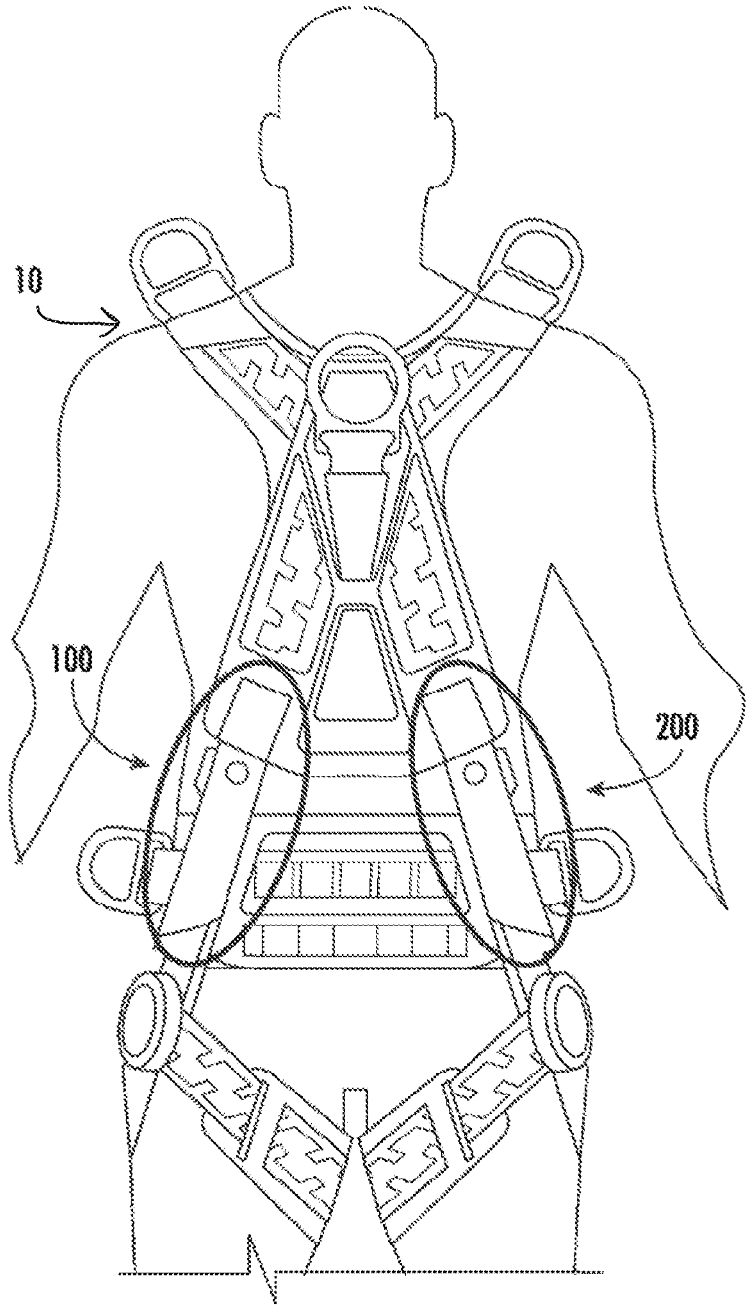
FIG. 1 illustrates a perspective view of an exemplary wearable safety harness as described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words “example,” or “exemplary,” when used herein, are intended to mean “serving as an example, instance, or illustration.” Any implementation described herein as an “example” or “exemplary embodiment” is not necessarily preferred or advantageous over other implementations.

As described herein, an example relief apparatus for providing physical relief to a user when suspended in the harness in the event of a fall is provided.

In various embodiments, the disclosed relief apparatus is configured for use with a full-body harness and a user of the full-body harness. Full-body harness, safety harnesses, harnesses, suspension devices, suspension systems, and/or similar terms used herein interchangeably are configured to protect a user from falls from dangerous heights. Typically, a harness is connected via a line to a secure point at or above a height at which the user is positioned, and in the event of a fall, tension of the line suspends the harness and the user in mid-air. Various harnesses are composed of various straps arranged and positioned in various configurations to secure and wrap around a user's body. Specifically, various harnesses may include an upper body portion and a lower body portion, where an upper body portion may include straps wrapped around a user's chest, shoulders, arms, and/or back while a lower body portion may include straps wrapped around a user's waist, hips, groin, pelvic region, legs, and/or the like.

In some instances, suspension trauma to a user of a harness may occur while the user is suspended by the harness in mid-air in the event of a fall. Straps of the harness that are wrapped around portions of the user's body may tighten and constrict as gravitational forces act on the user's body and tension is applied to various straps. Straps of a lower body portion of the harness especially may constrict or apply compression/pressure to the user's body, as such straps wrapped around the user's waist, hips, groin, hips, pelvic region, legs, and/or the like provide the main support for the user's body from falling. Such constriction leads to a cut-off of blood circulation for portions of the user's body (e.g., the user's legs), which may eventually lead to serious harm, injury, and/or death.

Various example embodiments of the present disclosure accordingly provide a relief apparatus at least partially secured relative to a harness and configured to provide a relief step device for at least partially mitigating the suspension trauma realized by a suspended user during a fall condition. The present invention may enable the user of a harness to quickly and efficiently leverage physical force against a deployed relief step device, enabling a user to physically displace his/her body away from and/or off of particular straps that may be constricting, compressing, and/or the like the user's body. In various embodiments, the relief apparatus includes a relief step device that may be deployed via an automated action initiated by the occurrence of a fall event. Thus, in some examples, various embodiments of the present disclosure provides relief apparatuses that facilitate an automated deployment of a relief step device such that the relief step device may be accessible to a user suspended within a harness as a result of a fall event.

As described herein, the present invention may be particularly preferable over relief apparatuses configured solely for manual deployment of a relief step device, as the automated deployment of the relief step device described herein embodies a consolidated and simplified relief step deployment action that eliminates the need for a suspended user to exert further physical energy and/or spend additional time executing manual deployment of a relief step feature. Further, as described herein, in various embodiments, the relief apparatus may comprise an activation assembly that enables both an automated deployment and a manual deployment of a relief step device in a fall condition. In various embodiments, an activation assembly of an exemplary relief apparatus may be configured to facilitate an automated deployment of a relief step device in a fall condition, and further configured to enable a manual deployment of the relief step device in an exemplary circumstance wherein the relief apparatus fails to execute an automated deployment of the relief step device upon a fall event occurring.

Further, in various embodiments, an exemplary relief apparatus described herein may comprise a relief step device comprising one or more adjustable elements disposed along the length of the relief strap device so as to be accessible to (e.g., reachable) and/or selectively adjustable by a suspended user in the event of a fall occurrence. In various embodiments, a relief apparatus comprising one or more adjustable elements may be configured to facilitate a selective adjustment of a length of the relief step device so as to be quickly and easily configurable in one or more adjustable lengths in order to accommodate the length of a suspended user's legs.

FIG. 1 illustrates a perspective view of an exemplary wearable safety harness as described herein. In particular, FIG. 1 illustrates a wearable safety harness comprising one or more relief apparatuses configured for automated deployment during and/or at least substantially immediately following a fall condition. In various embodiments, an item of personal protective equipment (PPE) for providing fall protection is shown as a piece of fall protection equipment (FPE) in the form of a safety/fall harness for use in fall protection, such as, for example, a wearable safety harness 10. In various embodiments, a wearable safety harness 10 may comprise a full-body safety harness configured to be worn by a user. For example, an exemplary wearable safety harness 10 may be a full-body harness comprising a plurality of straps configured to secure a user within the harness 10, such as, for example, be attaching the harness 10 to the user, and, further, to attach the harness 10 to other fall protection equipment, such as, for example, an anchor, a fall protection lanyard, a self-retracting lifeline, and/or the like. For example, a fall condition, as described herein, may be defined by harness condition wherein a user wearing a harness 10 has experienced an arrested fall such that the user has at least temporarily been suspended within the wearable safety harness 10. It should be understood that many types and configurations of safety/fall harnesses are known in the PPE and FPE industry, including full body harnesses and partial or hip/waist fall harnesses, all, or most, of which are suitable for use with the concepts disclosed herein. Accordingly, the wearable safety harness 10 depicted in FIG. 1 is provided for purposes of illustration and further specific details of the harness 10 will not be discussed herein except for those required for an understanding of the disclosed concepts, and that the appended claims are not limited to any specific details of a fall harness unless expressly recited in the claims.

In various embodiments, an exemplary wearable safety harness 10 may comprise one or more relief apparatuses at least partially secured to one or more of the plurality of straps of that harness 10. As described herein, a relief apparatus may be configured to facilitate deployment of a relief step device therefrom in the event of a fall, so as to provide a support upon which a user suspended in the safety harness 10 may step in order to enhance blood circulation. For example, a relief apparatus may comprise relief step comprising portions, such as, for example, an elongated strap attached at a distal end to a foot engagement surface upon which a suspended user may use to step, stand, move, flex leg muscles, and/or the like to alleviate compression against the harness straps and to improve blood circulation. In various embodiments, as described herein, a relief apparatus 100 may store a relief step within a housing during a baseline condition, and, further, may be configured for automated deployment of the relief step from within the housing during and/or at least substantially immediately following a fall condition. In various embodiments, the housing of a relief apparatus may be configurable between a closed configuration and an open configuration, wherein the baseline condition of the relief apparatus, such as, for example, prior to a fall event, is defined by the housing being arranged in a closed configuration with the relief step device stored therein. Further, in response to the wearable safety harness 10 exhibiting a fall condition, the relief apparatus may be reconfigured from the closed configuration to an open configuration such that at least a portion of the relief step device, such as, for example, a distal end of the relief step device, may be deployed from a stored position within the housing. For example, in such an exemplary circumstance, a relief apparatus may facilitate the automated deployment of a relief step device stored within the relief apparatus housing. Further, in various embodiments, an exemplary relief apparatus may be configured to facilitate a manual deployment of a relief step device in a fall condition, such as, for example, in an exemplary circumstance wherein the relief apparatus fails to execute an automated deployment of the relief step device upon a fall event occurring. For example, as illustrated, an exemplary wearable safety harness 10 may comprise a first relief apparatus 100 and a second relief apparatus 200, each secured relative to a respective portion of the safety harness 10 at least substantially proximate the lower body of a user, such as, for example, about one or more straps of a lower body portion of the harness 10 arranged so as to receive and/or engage a user's waist, hips, groin, hips, pelvic region, legs, and/or the like. As described herein, in an exemplary circumstance wherein the wearable safety harness 10 comprises a first relief apparatus 100 and a second relief apparatus 200, the first relief apparatus 100 may be configured to deploy a first relief step device configured for providing support for a first foot of a suspended user in a fall condition, and the second relief apparatus 200 may be configured to deploy a second relief step device configured for providing support for a second foot of the suspended user.

Figure 2:
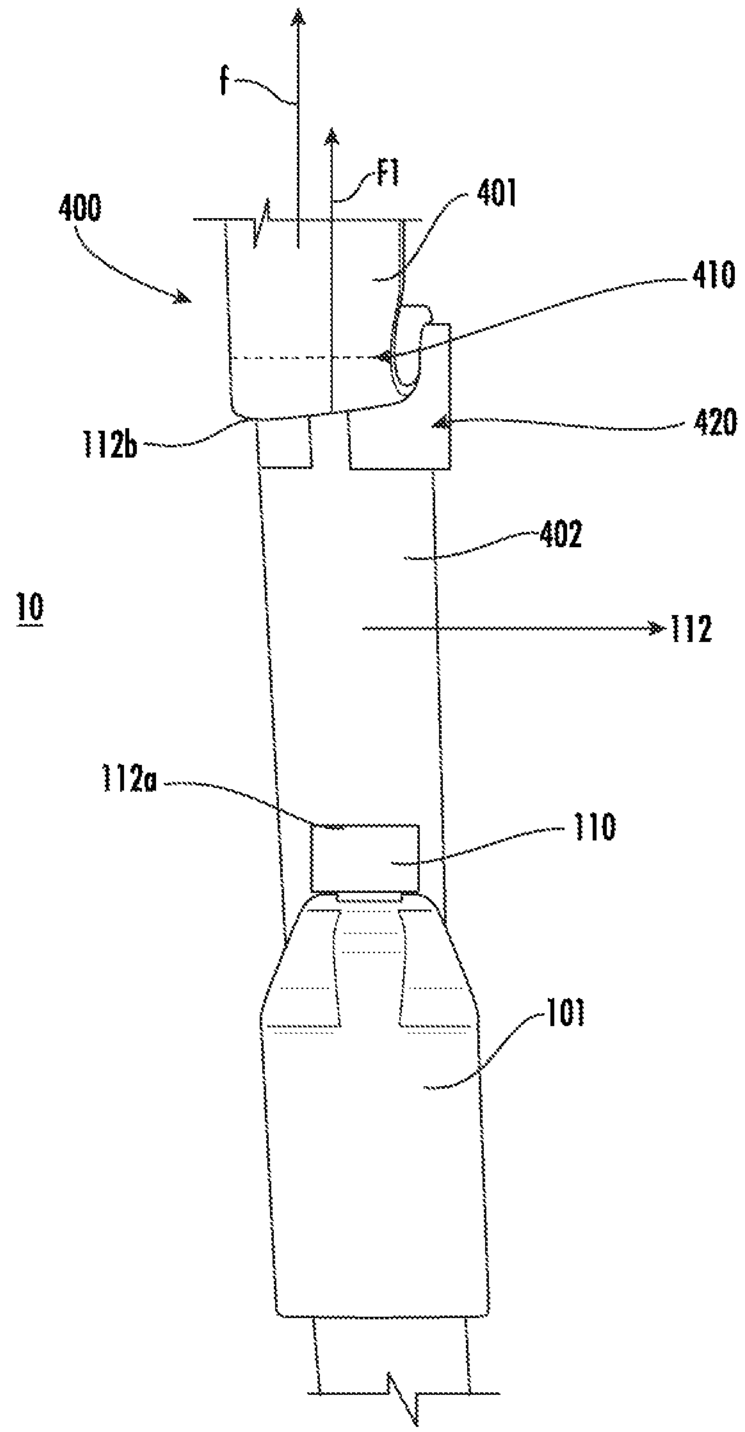
FIG. 2 illustrates a perspective view of an exemplary relief apparatus according to an example embodiments.

FIG. 2 illustrates a perspective view of an exemplary relief apparatus according to an example embodiments. In particular, FIG. 2 shows an exemplary relief apparatus secured relative to a lower body portion of a wearable safety harness. In various embodiments, an exemplary safety harness 10 comprising one or more relief apparatuses 100 may further comprise one or more fall indicators 400 provided at one or more corresponding key locations about the harness 10 at which the harness 10 will experience a shock load when a user 14 of the harness 10 experiences an arrested fall. For example, a shock load experienced by the harness 10 (e.g., at a fall indicator 400) may result in one or more forces generated by a weight of a user suspended within the harness 10 in a fall condition. For example, an exemplary fall indicator 400 may be configurable between a plurality of configurations in response to one or more shock loads (e.g., one or more forces) acting on the fall indicator and/or a strap of the safety harness 10 disposed at least substantially adjacent thereto, such that the fall indicator 400 may identify whether the wearable safety harness has previously been exposed and/or currently being exposed to a fall condition (e.g., whether a user has experienced a fall event while wearing the harness 10). For example, a fall indicator 400 may be configurable between a first state defining a baseline configuration wherein a user and the harness 10 have not experienced an arrested fall, and a second state wherein the user 14 and the harness 10 have experienced an arrested fall. In an exemplary circumstance wherein the fall indicator 400 is configured in the aforementioned second state, the fall indicator 400 may provide indication, alert, alarm, and/or the like indicative of the safety harness 10 having been previously exposed to a fall condition.

As a non-limiting example, FIG. 2 illustrates a fall indicator 400 defined by a length of a strap of the safety harness 10, wherein the length is arranged in a first condition. The exemplary fall indicator 400 in the first state is positioned such that the strap length is folded upon itself (e.g., a first strap portion 401 is folded relative to a second strap portion 402) and maintained in the folded condition by a breakable connection 410, such as, for example, a stitching, that is configured to break and/or release in response to the harness 10 exhibiting a fall condition (e.g., a user wearing the harness 10 experiencing an arrested fall). In the illustrated embodiment, the breakable connection 410 may be provided in the form of two spaced lines of stitching that extend through and connect adjacent portions of the strap length at one or more folds defined within the fall indicator 400. In various embodiments, the breakable connection 410 may comprise one or more suitable materials and/or stitching configurations configured to enable the lines of stitching to break when the fall indicator 400 (e.g., the first strap portion 401) experiences a predetermined tensile shock load F that corresponds to the expected load that will be experienced during an arrested fall. It should be appreciated that while the illustrated embodiment shows the breakable connection 410 in the form of the pair of spaced lines of stitching, other suitable connection forms are contemplated within the scope of the present disclosure, such as, for example, a single line of stitching, bonding agents or adhesive, one or more breakable/releasable rivet connections, and/or the like.

In various embodiments, upon the breakable connection 410 being broken, the fall indicator 400 may be reconfigured to the second state defined by an unfolded condition, wherein the portion of the strap length previously folded upon itself unfurls such that the second strap portion 402 previously secured to the stitching 410 extends away from the first strap portion 401. Such an exemplary configuration results in the length of the harness 10 being at least partially extended. In various embodiments, the extension of the strap portion defining at least a portion of the fall indicator 400 may further result in the exposure of a visual indicator 420 secured to a portion of the second strap portion 402 that was previously concealed by the folded first strap portion 401 of the fall indicator 400. For example, the visual indicator 420 may provide a visual indication (e.g., textual and/or otherwise) that the harness 10 has experienced a fall condition. In various embodiments, as described herein with respect to the exemplary embodiment illustrated in FIG. 1, a wearable safety harness 10 may comprise a plurality of fall indicators 400 positioned about various portions of the exemplary harness 10.

In various embodiments, as illustrated, the relief apparatus 100 of an exemplary safety harness 10 may be secured relative to a fall indicator 400. For example, in various embodiments wherein the wearable safety harness 10 comprises a plurality of relief apparatuses (e.g., relief apparatuses 100, 200), each of the plurality of relief apparatuses may be secured relative to a fall indicator 400. In various embodiments, a first activation strap 112 of the relief apparatus 100 may be fixedly secured to the first strap portion 401 of the fall indicator 400. For example, as described in further detail herein, a second end 112*b* of the first activation strap 112 may be attached to the first strap portion 401 of the fall indicator 400 and positioned at least substantially adjacent the breakable connection 410. Further, a first end 112*a* of the first activation strap 112 may be secured to a fastener element, such as, for example, a buckle element, configured to be engaged with a corresponding fastener element when the harness 10 is arranged in a baseline configuration (e.g., when the fall indicator 400 is configured in a first state). As described in further detail herein, the fastener element secured to the first end 112*a* of the first activation strap 112 may be configured such that it may be detachably received by a corresponding fastener element that itself is arranged so as to be is removably secured relative to the housing 101 of the relief apparatus 100. For example, the fastener element secured to the first end 112*a* of the first activation strap 112 and the aforementioned corresponding fastener element may each define a portion of the activation assembly 110, which may be arranged so as to define the configuration of the housing 101 between an open configuration and a closed configuration. As illustrated, the housing 101 of the relief apparatus 100 may be fixedly secured to the second strap portion 402 of the fall indicator 400, such that upon the breakable connection 410 being broken and the fall indicator 400 (e.g., the second strap portion 402) being reconfigured into an extended (e.g., unfolded) configuration, the extension of the second strap portion 402 away from the breakable connection 410 may cause the housing 101 secured to the second strap portion 402 to similarly move in a direction away from the breakable connection 410 (e.g., away from the first strap portion 401).

In such an exemplary circumstance, the harness 10 exhibiting a fall condition (e.g., the fall indicator 400 being reconfigured from a first state to a second state) may result in a relative movement between the housing 101 and the first activation strap 112, wherein the housing 101 is displaced along with the second strap portion 402 and the first activation strap 112 remains fixedly coupled to the first strap portion 401. Such a relative motion between the housing 101 and the first activation strap 112 may result in a first pulling force F1 being realized by the first activation strap 112 and acting on the first activation strap 112 in an at least substantially opposite direction away from the housing 101 and the activation assembly 110 secured relative thereto. For example, the first pulling force may be defined at least in part by the one or more forces acting on the fall indicator 400 as a result of the weight of the user of the safety harness 10, such as, for example, a shock load pulling force f. In such an exemplary circumstance, as described in further detail herein, the first pulling force F1 generated as a result of the fall condition acting on the relief apparatus 100 (e.g., between the first activation strap 112 and the activation assembly 110) may be realized at the activation assembly 110 such that the fastener element secured to the first end 112*a* of the first activation strap 112 may detach from the corresponding fastener element secured relative to the housing 101. For example, in response to the first activation strap 112 (e.g., the fastener element secured to the first end 112*a* thereof) being operably detached from the housing 101, such as, for example, via the detachment of the first activation strap 112 from the activation assembly 110, the housing 101 may be reconfigured from a closed configuration (e.g., a baseline configuration) to an open configuration, thereby resulting in an automated deployment of a relief step device stored within the housing 101.

Figure 3A:
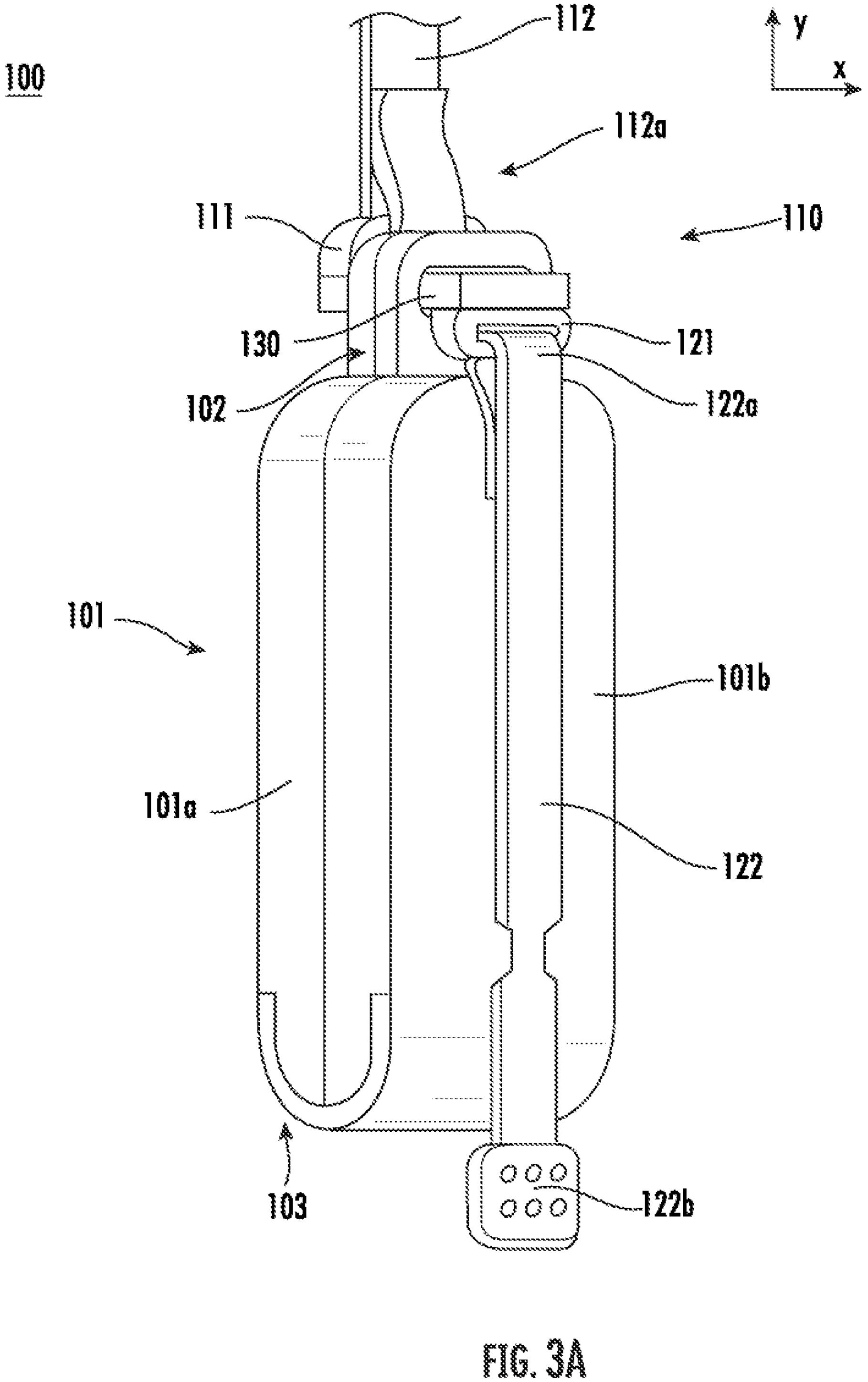
FIGS. 3A-3C illustrate various views of exemplary relief apparatuses according to various embodiments.
Figure 3C:
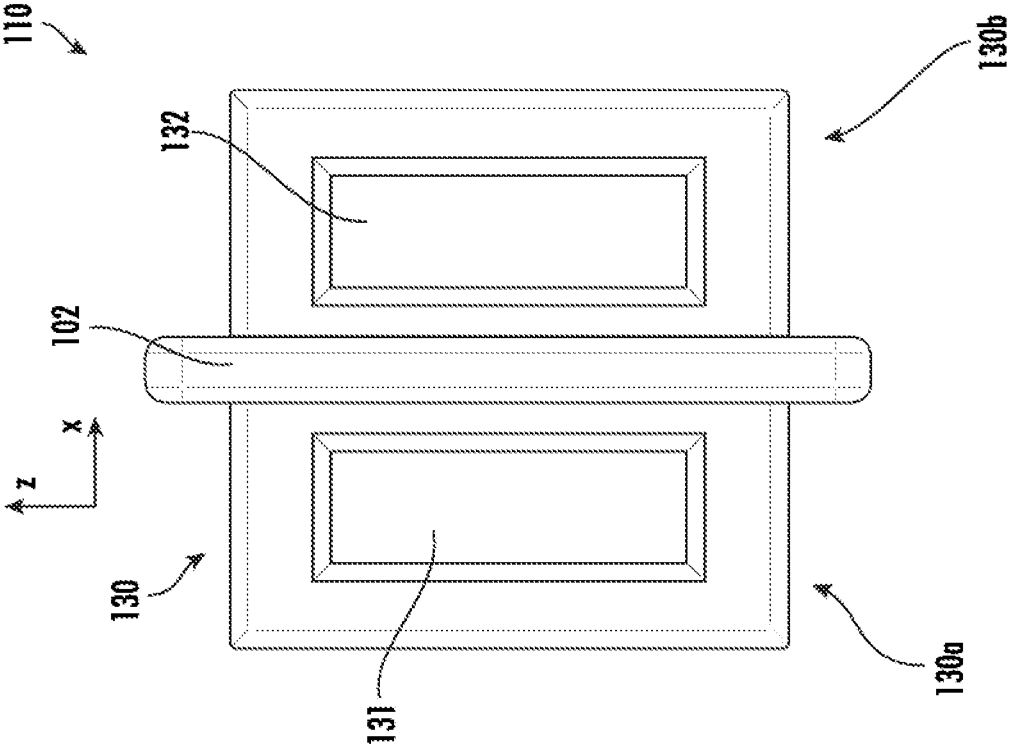
Figure 3B:
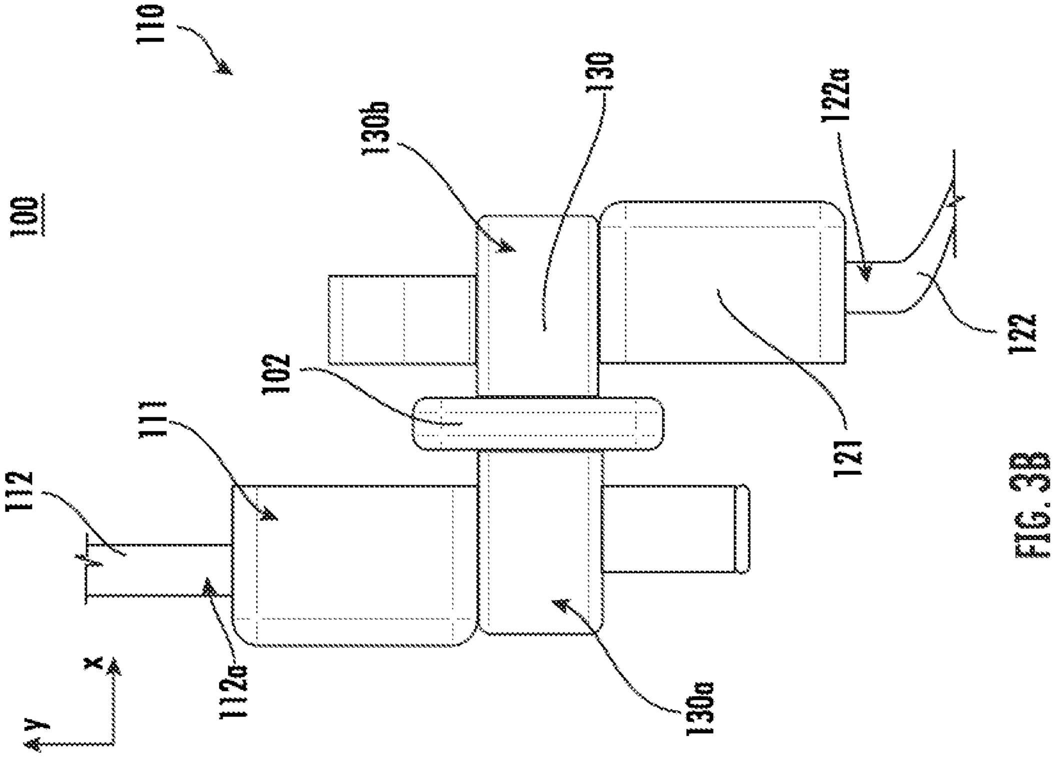

FIGS. 3A-3C illustrate various views of exemplary relief apparatuses according to various embodiments. In particular, FIG. 3A illustrates an exemplary relief apparatus comprising an activation assembly configured to facilitate an automated deployment of a relief step device in a fall condition. In various embodiments, an exemplary relief apparatus may comprise an activation assembly further configured to facilitate a manual deployment of a relief step device in a fall condition. For example, FIGS. 3B and 3C further illustrate exemplary activation assemblies configured for enabling both an automated deployment and a manual deployment of a relief step device in a fall condition. In various embodiments, an activation assembly of an exemplary relief apparatus may be configured to facilitate an automated deployment of a relief step device in a fall condition, and further configured to enable a manual deployment of the relief step device in an exemplary circumstance wherein the relief apparatus fails to execute an automated deployment of the relief step device upon a fall event occurring.

In various embodiments, an exemplary relief apparatus of a wearable safety harness may comprise a housing, an activation assembly, and a relief step device configured to be stored within an interior cavity of the housing when a harness is provided in a baseline condition. In various embodiments, the activation assembly may be configured to, in response to the wearable safety harness exhibiting a fall condition, facilitate an automated deployment of the relief step device from within the housing. For example, as illustrated in FIGS. 3A-3C, an exemplary relief apparatus 100 may comprise a housing 101 configured to store a relief step device within an interior housing cavity thereof, and an activation assembly 110.

As illustrated, an exemplary relief apparatus 100 may comprise a housing 101 embodying an exterior shell defining an interior housing cavity configured for storing a relief step device in a compact or stored state therein. In various embodiments, the housing 101 may comprise a first housing portion 101*a* and a second housing portion 101*b* that may be at least partially moveable relative to one another such that the housing 101 may be configurable between an open configuration and a closed configuration, as described herein. For example, in various embodiments, the first housing portion 101*a* of the housing 101 may comprise a base portion that may be at least partially secured relative to one or more straps of the wearable safety harness. Further, in various embodiments, the second housing portion 101*b* of the housing 101 may comprise a cover portion that may be at least partially secured relative to the first housing portion 101*a* (e.g., the base portion), such as, for example, via an at least substantially hinged connection, such that the cover portion may have a range of motion relative to the first housing portion 101*a* (e.g., the base portion) that extends at least between a first relative position and a second relative position. For example, the first relative position may define a closed housing configuration wherein the first housing portion 101*a* and the second housing portion 101*b* are arranged to provide an at least substantially enclosed interior housing cavity such that at least substantially all of a relief step device may be stored in a compact or stored state therein. As a further example, the second relative position may define an open housing configuration wherein at least a portion of the second housing portion 101*b* is at least substantially separated from and the first housing portion 101*a* such that the interior housing cavity is at least substantially exposed to an ambient environment and at least a portion of a relief step device stored therein may be deployed from within the housing 101. For example, the exemplary relief apparatus 100 illustrated in FIG. 3A is shown in a closed configuration.

In various embodiments, the housing 101 of an exemplary relief apparatus 100 may comprise a buckle interface 102 configured to engage at least a portion of an activation assembly 110, as described herein. For example, in various embodiments, the buckle interface 102 of the housing 101 may comprise one or more geometric features of the housing 101 configured to receive, secure, and/or otherwise engage a buckle component 130 of an activation assembly 110. In various embodiments, a buckle interface 102 may comprise a protrusion extending in an outward direction from one or more exterior surfaces of housing 101, the protrusion including an orifice extending through a thickness of the protrusion such that at least a portion of a buckle component 130 may be arranged within the orifice extending along the entirety of the thickness of the protrusion from a first side to a second side of the buckle interface 102, as described herein. As illustrated in FIG. 2, wherein the first housing portion 101*a* comprises a base portion and the second housing portion 101*b* comprises a cover portion, the buckle interface 102 may be defined by corresponding protrusions extending from each of the base portion and the cover portion and arranged so as to be at least substantially adjacent one another when the housing 101 is configured in a closed configuration. In such an exemplary circumstance, an orifice of the buckle interface 102 (e.g., extending along the entirety of a thickness of the protrusion) may be defined by a first orifice extending through a first protrusion of the base portion 101*a* and a second orifice extending through a second protrusion of the cover portion 101*b*, wherein the orifices are coaxially arranged in an at least substantially aligned configuration when the housing 101 is configured in a closed configuration. In such an exemplary circumstance, as described in further detail herein, the buckle component 130 of the activation assembly 110 may extend through both the first orifice and the second orifice and, further, the activation assembly 110 may be configured to engage the buckle interface 102 so as to at least partially restrict the relative motion between the base portion 101*a* and the cover portion 101*b* and maintain the closed configuration of the housing 101.

In various embodiments, an activation assembly of an exemplary relief apparatus may comprise a first activation strap coupled to a first buckle element, a second activation strap coupled to a second buckle element, and a buckle component configured to engage both the first and second buckle elements. For example, as illustrated in FIGS. 3A-3C, an exemplary activation assembly 110 of a relief apparatus 100 may comprise a first activation strap 112 having a first male buckle 111 coupled thereto (e.g., about a first end of the first activation strap 112), a second activation strap 122 having a second male buckle 121 coupled thereto (e.g., about a first end of the second activation strap 122), and a buckle component 130 comprising a first female buckle element 131 disposed about a first buckle end 130*a* of the buckle component 130 and a second female buckle element 132 disposed about a second buckle end 130*b* opposite the first buckle end 130*a*, wherein the first and second female buckle elements 131, 132 are configured to receive the first and second male buckles 111, 121, respectively.

In various embodiments, the first activation strap 112 of the activation assembly 110 may comprise a length extending at least between a first end coupled to a first male buckle 111 and a second end coupled to a portion of the wearable safety harness. As described herein, in various embodiments, the second end of the first activation strap 112 may be fixedly secured relative to a fall indicator portion of the wearable safety harness. Further, in various embodiments, the first activation strap 112 may be coupled at a first end to the first male buckle 111 such that one or more forces acting on the first activation strap 112 (e.g., via the portion of the wearable safety harness connected to the second end of first activation strap 112) may be transmitted to the first male buckle 111.

In various embodiments, the first male buckle 111 may be configured to be removably secured relative to a first female buckle element 131 disposed about a first buckle end 130*a* of the buckle component 130 via one or more fastening means. For example, the first male buckle 111 may be received by the first female buckle element 131 of the buckle component 130 such that when the first male buckle 111 is engaged with the buckle component 130 (e.g., via the first female buckle element 131), the first male buckle 111 may at least partially restrict the range of relative motion between the buckle component 130 and the buckle interface 102 of the housing 101 in one or more lateral directions. In such an exemplary circumstance, the engagement of the first male buckle 111 with the first female buckle element 131 disposed about a first buckle end 130*a* of the buckle component 130 may result in a physical engagement between the buckle interface 102 and the first male buckle 111 and/or the first activation strap 112 that prevents the buckle component 130 from translating laterally relative to the buckle interface 102 toward the second buckle end 130*b* of the buckle component 130. For example, as the buckle component 130 moves relative to the buckle interface 102 in a lateral direction toward the second buckle end 130*b* of the buckle component 130, at least a portion of the first male buckle 111 and/or the first activation strap 112 may abut against a portion of the buckle interface 102 so as to prevent any further lateral motion between the buckle component 130 and the buckle interface 102 in that direction. For example, as illustrated, when engaged with the first female buckle element 131 of the buckle component, the first male buckle 111 may prevent the buckle component 130 from being removed out from within the buckle interface 102 through the cover portion 101*b* of the housing 101 (e.g., in the positive x-direction, as illustrated).

As illustrated, in various embodiments, an activation assembly 110 may further comprise a second activation strap 122 coupled to a second buckle element 121. In various embodiments, the second activation strap 122 of the activation assembly 110 may comprise a length extending at least between a first end 122*a* coupled to a second male buckle 121 and a second end 122*b* opposite the first end 122*a* that is arranged in an unconstrained configuration such that the second activation strap 122 may define an at least partially suspended configuration relative to the second male buckle 121 coupled thereto. Further, in various embodiments, the second activation strap 122 may be coupled at the first end 122*a* to the second male buckle 121 such that one or more forces acting on the first activation strap 122 (e.g., a pulling force generated by a pulling action of a user on at least a portion of the second activation strap 122) may be transmitted to the second male buckle 121.

In various embodiments, the second male buckle 121 may be configured to be removably secured relative to a second female buckle element 132 disposed about a second buckle end 130*b* of the buckle component 130 via one or more fastening means. For example, the second male buckle 121 may be received by the second female buckle element 132 of the buckle component 130 such that when the second male buckle 121 is engaged with the buckle component 130 (e.g., via the second female buckle element 132), the second male buckle 121 may at least partially restrict the range of relative motion between the buckle component 130 and the buckle interface 102 of the housing 101 in one or more lateral directions. In particular, by way of illustration, in an exemplary circumstance wherein when the second male buckle 121 is engaged with the buckle component 130 (e.g., via the second female buckle element 132), the second male buckle 121 may be configured so as to at least partially restrict the range of relative motion between the buckle component 130 and the buckle interface 102 of the housing 101 in a lateral direction that is at least substantially opposite of that corresponding to the restricted range of relative motion defined by the first male buckle 111 being engaged with the buckle component 130, as described above. In various embodiments, the engagement of the second male buckle 121 with the second female buckle element 132 disposed about the second buckle end 130*b* of the buckle component 130 may result in a physical engagement between the buckle interface 102 and the second male buckle 121 and/or the second activation strap 122 that prevents the buckle component 130 from translating laterally relative to the buckle interface 102 toward the first buckle end 130*a* of the buckle component 130. For example, as the buckle component 130 moves relative to the buckle interface 102 in a lateral direction toward the first buckle end 130*a* of the buckle component 130, at least a portion of the second male buckle 121 engaged with the buckle component 130 may abut against a portion of the buckle interface 102 so as to prevent any further lateral motion between the buckle component 130 and the buckle interface 102 in that direction. As illustrated, when engaged with the second female buckle element 132 of the buckle component 130, the second male buckle 121 may prevent the buckle component 130 from being removed out from within the buckle interface 102 through the base portion 101*a* of the housing 101 (e.g., in the negative x-direction, as illustrated).

As illustrated in FIGS. 3A and 3B, in various embodiments, a relief apparatus 100 may be configured such that the first male buckle 111 and the second male buckle 121 may simultaneously engaged with the buckle component 130. For example, the first male buckle 111 may be engaged with the first female buckle element 131 at a first buckle end 130*a* of the buckle component 130 while the second male buckle 121 is simultaneously engaged with the second female buckle element 132 at a second buckle end 130*b* of the buckle component 130. In such an exemplary circumstance, as shown, the first male buckle 111 may restrict the range of relative motion between the buckle component 130 and the buckle interface 102 of the housing 101 in a first lateral direction (e.g., defining a limit on the relative motion that may be exhibited by the buckle component 130 relative to the buckle interface in the positive x-direction), and the second male buckle 121 may further restrict the range of relative motion between the buckle component 130 and the buckle interface 102 of the housing 101 in a second lateral direction that is at least substantially opposite the first lateral direction (e.g., defining a limit on the relative motion that may be exhibited by the buckle component 130 relative to the buckle interface 102 in the negative x-direction). In such an exemplary configuration wherein both the first male buckle 111 and the second male buckle 121 are simultaneously engaged with respective female buckle elements of the buckle component 130, the physical engagement of the first male buckle 111 and/or the second male buckle 121 with the buckle interface 102 of the housing 101 may at least substantially minimize the range of relative motion between the first housing portion 101*a* (e.g., the base portion) and the second housing portion 101*b* (e.g., the cover portion), so as to cause the housing 101 to be maintained in a closed configuration, as described herein.

In various embodiments, an exemplary relief apparatus 100 may comprise an activation assistance element 103 disposed about the housing 101. In various embodiments, an activation assistance element 103 may be configured to apply one or more forces to at least a portion of the housing 101, such as, for example, the first housing portion 101 and/or the second housing portion 101*b*, such that the housing 101 is predisposed to be arranged in an open configuration. For example, in various embodiments, an activation assistance element 103 may be configured to apply a force (e.g., a pushing force) to each of the first housing portion 101*a* and the second housing portion 101*b*, respectively, in at least substantially opposite directions so as to initiate and/or facilitate a separation of at least a portion of the first housing portion 101*a* away from a corresponding portion of the second housing portion 101*b*.

As a non-limiting example, the exemplary relief apparatus 100 illustrated in FIG. 3A comprises an activation assistance element 103 that comprises a flexible material sheet fixedly secured to each of the first housing portion 101*a* and the second housing portion 101*b*, such that the first housing portion 101*a* is at least partially secured relative to a portion of the second housing portion 101*b* via the flexible material sheet. In various embodiments, the flexible material sheet may have a baseline configuration defined by an at least substantially flat (e.g., planar) arrangement. Further, an exemplary flexible material sheet may be flexible such that the sheet may be reconfigured to a deformed configuration based at least in part on an at least substantially elastic deformation exhibited by the flexible material sheet corresponding to the arrangement of the respective housing portions secured thereto. As shown, in an exemplary circumstance wherein the housing 101 is arranged in a closed configuration, the flexible material sheet defining the activation assistance element 103 may be arranged in a deformed configuration defined by the elastic deformation (e.g., bending) of the flexible metal sheet. The flexible material sheet defining the activation assistance element 103 may be configured such that, in response to one or both of the first male buckle 111 and the second male buckle 121 disengaging from the buckle component 130, the flexible material sheet may be predisposed to at least partially return to a baseline configuration, thereby resulting in a separation of the respective portions of the first housing portion 101*a* and the second housing portion 101*b* secured thereto. Although described herein with respect to the exemplary illustrated embodiment shown in FIG. 3. that includes an activation assistance element comprising a flexible material sheet secured between the first and second housing portions 101*a*, 101*b*, it should be understood that the activation assistance element 103 may comprise any suitable mechanism, arrangement, positioning, and/or the like configured to facilitate a predisposition of the housing 101 to an open configuration, such as, for example, one or more spring assemblies arranged between the respective housing portions.

As described herein, in an exemplary circumstance wherein the housing 101 is arranged in a closed configuration (e.g., wherein both a first male buckle 111 secured to a first activation strap 112 and a second male buckle 121 secured to a second activation strap 122 are simultaneously engaged with a buckle component 130 provided within a buckle interface 102 of the housing 101), the activation assistance element 103 may be disposed relative to the housing 101 in an at least substantially constrained configuration. An activation assistance element 103 comprising a constrained configuration may generate one or more forces that may be transmitted to the housing 101 (e.g., acting on the first housing portion 101*a* and/or the second housing portion 101*b*) such that, upon one or both of the first male buckle 111 and the second male buckle 121 disengaging from the buckle component 130, the one or more forces generated by the activation assistance element 103 may initiate and/or facilitate the reconfiguration of the housing 101 from the closed configuration to the open configuration. For example, the activation assistance element 103 may initiate and/or facilitate the reconfiguration of the housing 101 from the closed configuration to the open configuration by generating one or more forces that result in a relative movement between the first housing portion 101*a* and the second housing portion 101*b* (e.g., a separation of the cover portion away from the base portion).

Figure 4B:
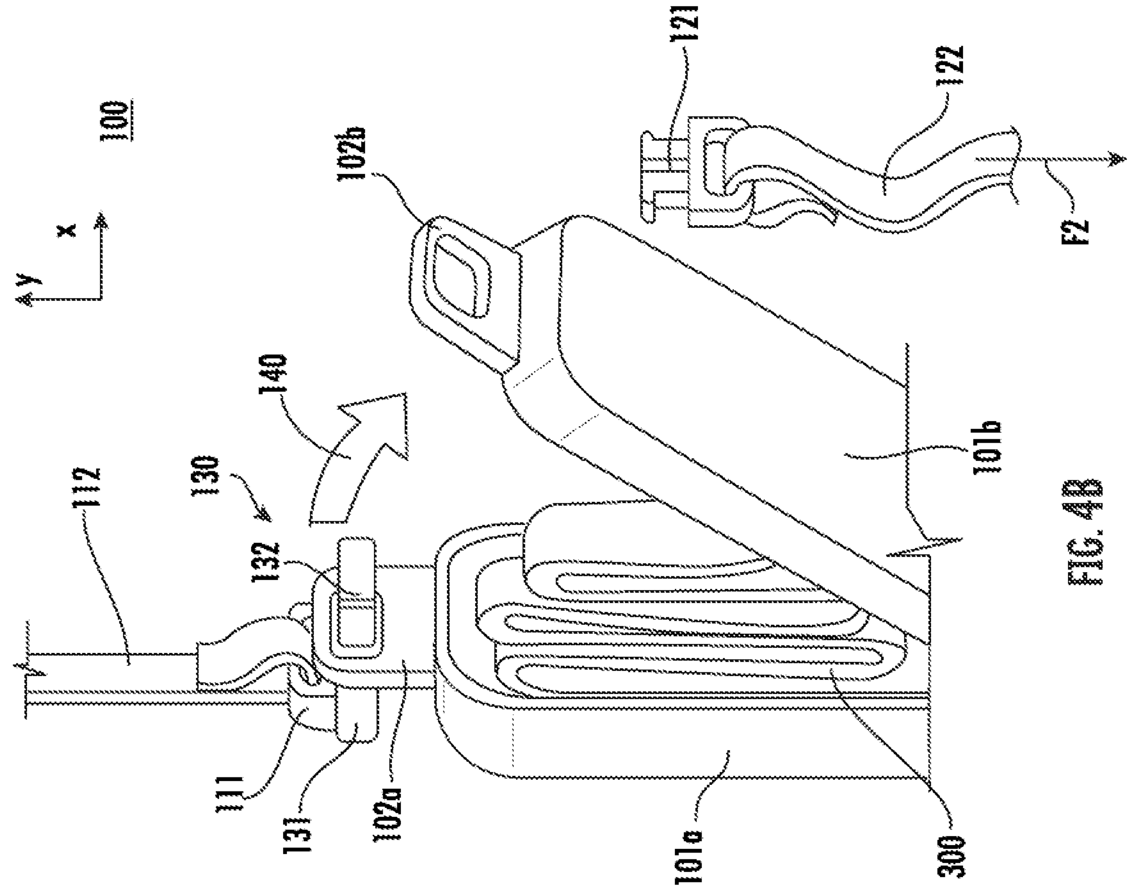
FIGS. 4A-4B illustrate perspective views of exemplary relief apparatuses according to various embodiments.
Figure 4A:
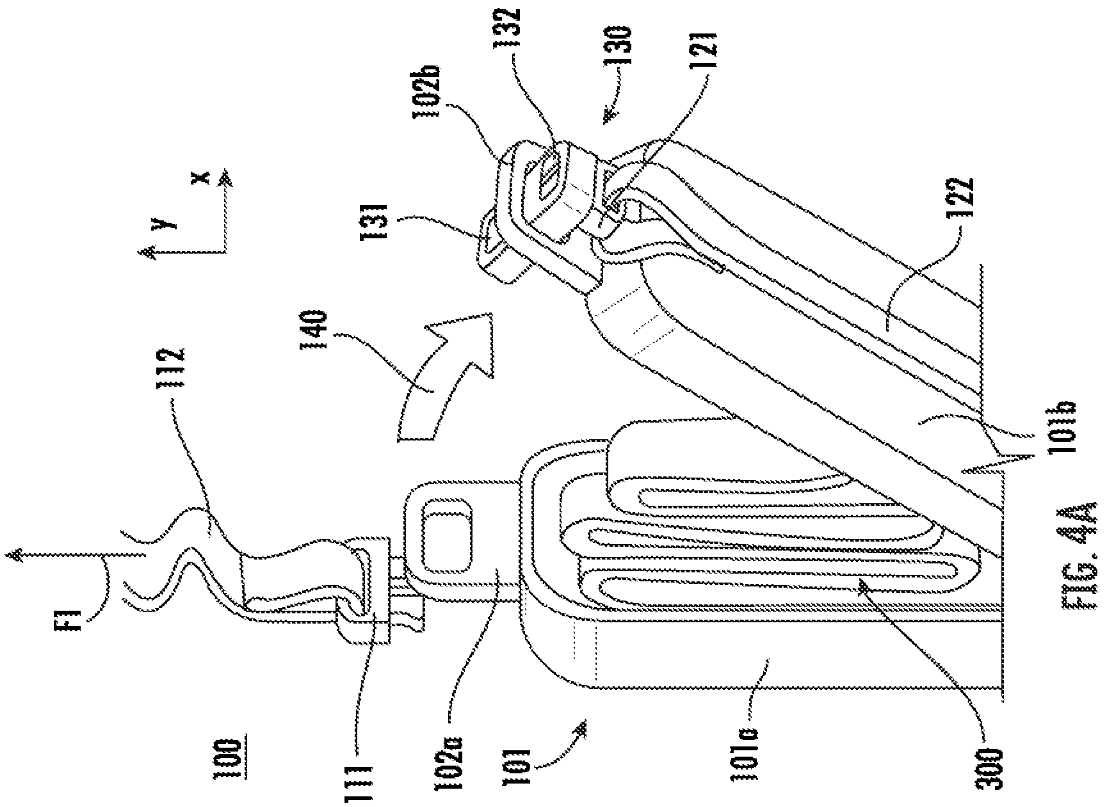

FIGS. 4A-4B illustrate perspective views of exemplary relief apparatuses according to various embodiments. As described herein, in various embodiments, an exemplary relief apparatus may be configured to enable and/or facilitate one or both of an automated deployment and a manual deployment of at least a portion of a relief step device from a stored position within a relief apparatus housing in the event of a fall (e.g., wherein a wearable safety harness experiences a fall condition). In particular, FIG. 4A schematically illustrates an exemplary relief apparatus 100 in an at least partially open configuration as the relief apparatus 100 is being reconfigured from a previously closed configuration to an open configuration to facilitate an automated deployment of a relief strap device. Further, FIG. 4B schematically illustrates the exemplary relief apparatus 100 in an at least partially open configuration as the relief apparatus 100 is being reconfigured from a previously closed configuration to an open configuration to facilitate a manual deployment of a relief strap device.

As described herein, a housing 101 may define an interior housing portion within which a relief step device 300 may be stored in a stored and/or compact position when the housing 101 is arranged in a closed configuration. In various embodiments, the housing 101 may be reconfigurable from a closed configuration to an open configuration based at least in part on a reconfiguration of one or more elements of an activation assembly 110 of the relief apparatus 100. For example, in various embodiments, the housing 101 may be reconfigurable from a closed configuration to an open configuration based at least in part on a disengagement of at least one of the first male buckle 111 and the second male buckle 121 from a corresponding buckle element (e.g., first female buckle element 131, second female buckle element 132) of the buckle component 130 provided within the buckle interface 102 of the housing 101. In various embodiments, as illustrated in FIG. 4A, the relief apparatus 100 may be configured such that an automatic deployment of the relief step device 300 from within the housing 101 may be enabled at least in part by a disengagement of the first male buckle 111 from the first female buckle element 131. For example, the disengagement of the first male buckle 111 from the first female buckle element 131 may be caused by a first pulling force F1 that is generated by the wearable harness upon experiencing a fall condition acting (e.g., pulling) on the first activation strap 112 in a direction at least substantially away from the first female buckle element 131.

As a result of the disengagement of the first male buckle 111 from the first female buckle element 131, the range of lateral motion between the buckle component 130 and the buckle interface may become at least substantially unconstrained in the first lateral direction (e.g., by removing a physical limitation on the relative motion that may be exhibited between the buckle component 130 and the buckle interface 102 in the positive x-direction) such that the buckle component 130 may translate laterally relative to at least a portion of the buckle interface 102 (e.g., a first buckle interface portion 102*a*) in the first lateral direction toward the first buckle end 130*a* of the buckle component 130. For example, as illustrated, upon being disengaged from the first male buckle 111, the buckle component 130 may remain engaged with the second male buckle 121 and may be removed from within the first buckle interface portion 102*a* in the positive x-direction in response to the second housing portion 101*b* moving relative to the first housing portion 101*a* in an opening direction 140. As described herein, in various embodiments, the housing 101 may be predisposed towards an open configuration, such that the reconfiguration of the housing 101 from the previously closed configuration to an open configuration may be automatically initiated upon the disengagement of the first male buckle 111 from the first female buckle element 131. Accordingly, the relief apparatus 100 may be configured to facilitate an automated deployment of at least a portion of a relief step device 300 stored within a housing 101 in the event of a fall based at least in part on one or more resultant forces (e.g., a first pulling force F1) generated in response to a fall event acting on an activation assembly 110 of the relief apparatus so as to initiate the reconfiguration of the housing 101 from the closed configuration to an at least partially open configuration.

In various embodiments, an exemplary relief apparatus 100 may be configured to enable a manual deployment of the relief step device 300 in an exemplary circumstance wherein, upon a fall event occurring, the relief apparatus 100 fails to execute an automated deployment of the relief step device 300, as described herein. As further illustrated in FIG. 4B, the relief apparatus 100 may be configured such that a manual deployment of the relief step device 300 from within the housing 101 may be enabled at least in part by a disengagement of the second male buckle 121 from the second female buckle element 132. For example, the disengagement of the second male buckle 121 from the second female buckle element 132 may be caused by a second pulling force F2 acting on the first activation strap 122 in a direction at least substantially away from the second female buckle element 132. In various embodiments, the second pulling force F2 may be generated by a pulling action of a user (e.g., in a negative y-direction, as illustrated) on at least a portion of the second activation strap 122. The second pulling force F2 acting on the second activation strap 122 may be transmitted at least in part to the second male buckle 121 coupled thereto so as to pull the second male buckle 121 in a direction at least substantially away from the second female buckle element 132 with a force sufficient to cause the second male buckle 121 to disengage from the second female buckle element 132.

As a result of the disengagement of the second male buckle 121 from the second female buckle element 132, the range of lateral motion between the buckle component 130 and the buckle interface 102 may become at least substantially unconstrained in the second lateral direction (e.g., by removing a physical limitation on the relative motion that may be exhibited between the buckle component 130 and the buckle interface 102 in the negative x-direction) such that the buckle component 130 may translate laterally relative to at least a portion of the buckle interface 102 (e.g., a second buckle interface portion 102*b*) in the second lateral direction toward the second buckle end 130*b* of the buckle component 130. For example, as illustrated, upon being disengaged from the second male buckle 121, the buckle component 130 may remain engaged with the first male buckle 111 as the second buckle interface portion 102*b* moves away from buckle component 130. As illustrated, a movement of the second buckle interface portion 102*b* away from the first buckle interface portion 102*a* and the buckle component 130 extending therethrough may be initiated in the positive x-direction based at least in part on the second housing portion 101*b* moving relative to the first housing portion 101*a* in an opening direction 140. As described herein, in various embodiments, the housing 101 may be predisposed towards an open configuration, such that the reconfiguration of the housing 101 from the previously closed configuration to an open configuration may be automatically initiated upon the disengagement of the second male buckle 121 from the second female buckle element 132. Accordingly, the relief apparatus 100 may be configured to facilitate a manual deployment of at least a portion of a relief step device 300 stored within a housing 101 based at least in part on one or more resultant forces (e.g., a second pulling force F2) generated in response to a user interaction and acting on an activation assembly 110 of the relief apparatus 100 so as to initiate the reconfiguration of the housing 101 from the closed configuration to an at least partially open configuration.

Figure 5A:
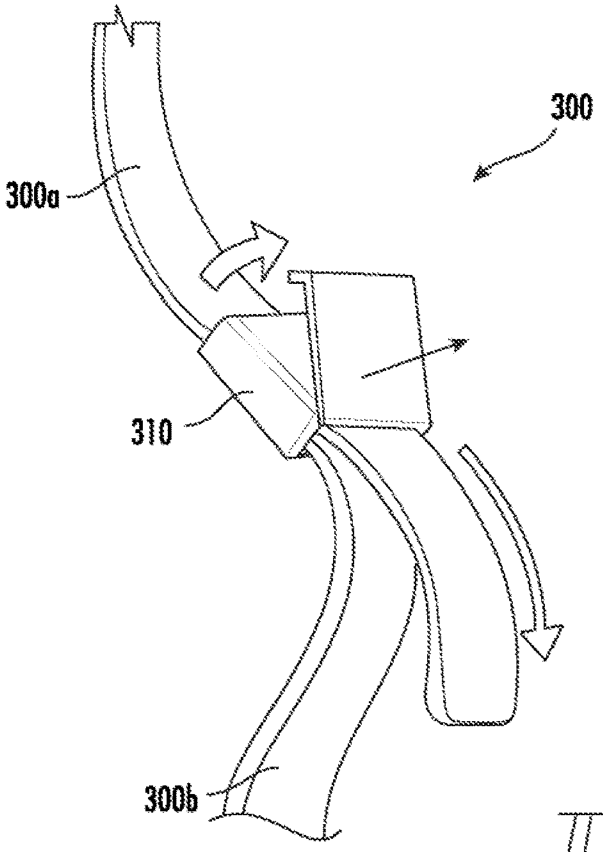
FIGS. 5A-5B illustrate perspective views of exemplary relief apparatuses according to various embodiments.
Figure 5B:
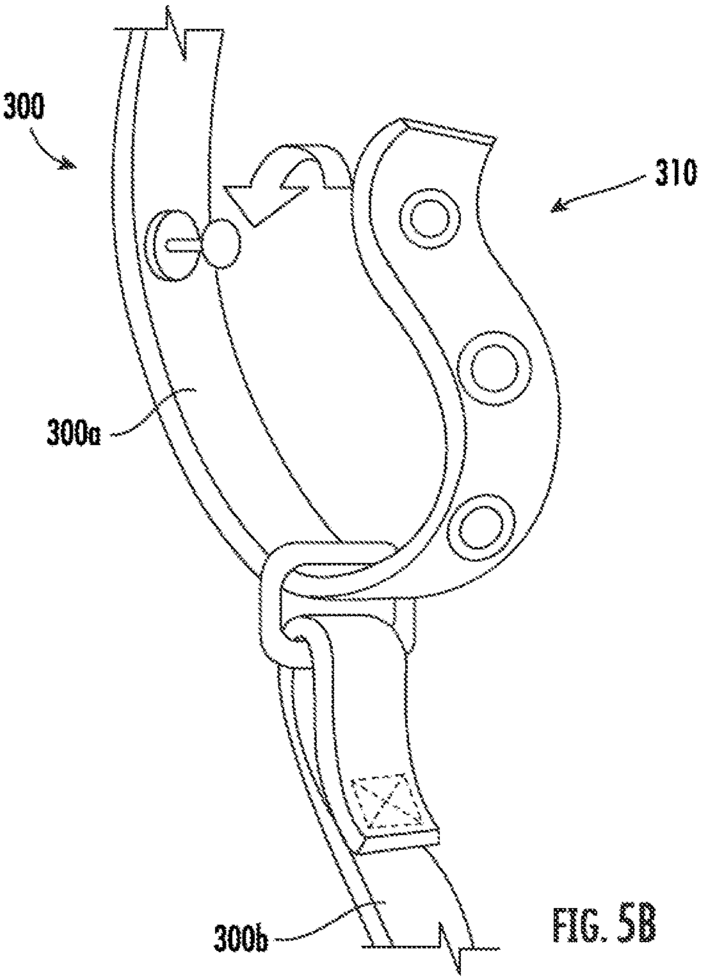

FIGS. 5A-5B illustrate perspective views of exemplary relief apparatuses according to various embodiments. In particular, FIGS. 5A and 5B illustrate various relief step devices of exemplary relief apparatuses according to various embodiments described herein, wherein the relief step devices comprise one or more adjustment elements configured to facilitate a selective adjustment of a length of the relief step device. In various embodiments, an exemplary relief step device 300 may comprise a strap element defined at least in part by a length extending between a first relief strap end and a second relief step end. For example, in various embodiments, a first relief strap end may comprise a proximate relief step end fixedly secured relative to at least a portion of the wearable harness, such as, for example, being fixedly secured within an interior housing portion of an exemplary relief apparatus housing, as described herein. Further, a second relief strap end may comprise a distal relief step end that may be attached to a foot engagement surface upon which a suspended user may use to step, stand, move, flex leg muscles, and/or the like. In various embodiments, an exemplary relief step device 300 may comprise a plurality of straps comprising a first relief step strap 300*a* and a second relief step strap 300*b*. For example, the first relief step strap 300*a* and the second relief step strap 300*b* may be operably secured relative to another, such that the length of the relief step device 300 is defined at least in part by at least a portion of a first relief strap length of the first relief step strap 300*a* and at least a portion of a second relief strap length of the second relief step strap 300*b*.

In various embodiments, a desirable length of the relief step device may be based at least in part on the length of the legs of a user. Accordingly, an exemplary relief step device 300 may comprise one or more adjustment elements 310 disposed along the length of the relief strap 300 configured to facilitate a selective adjustment of a length of the relief step device 300 by a user. For example, the one or more adjustment elements 310 may be disposed along the length of the relief strap device 300 in a position that is sufficiently proximate the first relief step end such that the one or more adjustment elements 310 may be accessible to (e.g., reachable) and/or selectively adjustable by a suspended user in the event of a fall occurrence. In various embodiments, as illustrated in FIGS. 5A and 5B, the relief step 300 may be configured such that the one or more adjustment elements 310 at least partially secure the first relief step strap 300*a* relative to the second relief step strap 300*b* in an at least substantially adjustable configuration via one or more mechanical fastening means, such as, for example, an adjustable buckle element and/or a plurality of buttons, as illustrated in FIGS. 5A and 5B, respectively. It should be understood that the one or more adjustable elements 310 may comprise any mechanical fastening means capable of being arranged and/or configured to facilitate a selective adjustment between a plurality of relief step length configurations, such as, for example, hook and loop fasteners, snaps, buttons, zippers, magnets, and/or the like, including any mechanism that may be used to facilitate the selective adjustment of the relief step length of an exemplary relief step device 300, as described herein.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A relief apparatus comprising:

a housing comprising an interior housing portion configured to store a relief step device therein, the housing being at least partially secured to a wearable safety harness; and an activation assembly configured to facilitate an automated deployment of at least a portion of the relief step device from within the interior housing portion in response to a fall occurrence, wherein the activation assembly comprises:

a first fastener element comprising a first male buckle, a second fastener element comprising a second male buckle, and a fastener receiver component comprising:

a first receiver portion comprising a first female buckle element disposed about a first end of the fastener receiver component and configured to receive the first male buckle, and a second receiver portion comprising a second female buckle element disposed about a second end of the fastener receiver component and configured to receive the second male buckle;

wherein the automated deployment of the at least a portion of the relief step device is based at least in part on a load force acting on at least a portion of the activation assembly, wherein the load force is defined at least in part by a force generated as a result of the fall occurrence, wherein the automated deployment of the at least a portion of the relief step device is based at least in part on the load force acting on a first portion of the activation assembly, wherein the first portion of the activation assembly comprises the first fastener element removably coupled to the fastener receiver component.

2. The relief apparatus of claim 1, wherein the fastener receiver component is removably engaged relative to at least a portion of the housing wherein the automated deployment of the at least a portion of the relief step device is based at least in part on the load force acting on the first portion of the activation assembly defined at least in part by the first fastener element.

3. The relief apparatus of claim 2, wherein the activation assembly further comprises:

a first activation strap extending between a first strap end coupled to the first fastener element and a second strap end fixedly secured to an activation strap interface portion of the wearable safety harness;

wherein the automated deployment of the at least a portion of the relief step device is facilitated by a first disengagement of the first fastener element relative to the fastener receiver component, wherein the first disengagement is caused at least in part by the load force acting on the first activation strap.

4. The relief apparatus of claim 3, wherein the first disengagement of the first fastener element relative to the fastener receiver component enables the housing to be configured in an at least substantially open configuration.

5. The relief apparatus of claim 1, wherein the first fastener element is configurable between an engaged condition and a disengaged condition relative to the fastener receiver component, wherein the relief apparatus is configured such that the first fastener element arranged in the engaged condition is configured to at least partially restrict a range of relative motion between the fastener receiver component and the housing in a first lateral direction.

6. The relief apparatus of claim 2, further comprising a fastener interface element secured relative to the housing and configured to engage at least a portion of the activation assembly so as to at least partially define a range of relative motion between the fastener receiver component and the housing.

7. The relief apparatus of claim 1, wherein at least a portion of the activation assembly is secured relative to a fall indicator strap portion provided within the wearable safety harness, the fall indicator strap portion being configured to transition from a first indicator state to a second indicator state in response to the fall occurrence; wherein the load force acting on the at least a portion of the activation assembly is based at least in part on the fall indicator strap portion transitioning from the first indicator state to the second indicator state.

8. The relief apparatus of claim 1, wherein the activation assembly is further configured to facilitate a manual deployment of the at least a portion of the relief step device from within the interior housing portion.

9. The relief apparatus of claim 8, wherein the manual deployment of the at least a portion of the relief step device is based at least in part on an applied force acting on a second portion of the activation assembly, wherein the applied force is defined at least in part by a user-generated force resulting from a user interaction with the relief apparatus.

10. The relief apparatus of claim 9, wherein the fastener receiver component is removably engaged relative to at least a portion of the housing; and wherein the second portion of the activation assembly comprises the second fastener element removably coupled to the fastener receiver component.

11. The relief apparatus of claim 10, wherein each of the first fastener element and the second fastener element is configurable between a engaged condition and a disengaged condition relative to the first receiver portion and the second receiver portion, respectively; wherein the relief apparatus is configured such that the first fastener element is arranged in the engaged condition relative to the first receiver portion is configured to at least partially restrict a first range of relative motion between the fastener receiver component and the housing in a first lateral direction, and the second fastener element is arranged in the engaged condition relative to the second receiver portion is configured to at least partially restrict a second range of relative motion between the fastener receiver component and the housing in a second lateral direction.

12. The relief apparatus of claim 11, wherein the activation assembly further comprises:

a first activation strap extending between a first strap end coupled to the first fastener element and a second strap end fixedly secured to an activation strap interface portion of the wearable safety harness;

a second activation strap coupled to the second fastener element;

wherein the automated deployment of the at least a portion of the relief step device is facilitated by a first disengagement of the first fastener element relative to the first receiver portion of the fastener receiver component; and wherein the manual deployment of the at least a portion of the relief step device is facilitated by a second disengagement of the second fastener element relative to the second receiver portion of the fastener receiver component.

13. The relief apparatus of claim 12, wherein the first disengagement is caused at least in part by the load force acting on the first activation strap; and wherein the second disengagement is caused at least in part by a user-generated force resulting from a user interaction with the second activation strap.

14. The relief apparatus of claim 10, wherein the housing defines a closed configuration based at least in part on both the first fastener element and the second fastener element being arranged in respective engaged conditions relative to the fastener receiver component.

15. The relief apparatus of claim 14, wherein one or more of a first disengagement of the first fastener element relative to the fastener receiver component and a second disengagement of the second fastener element relative to the fastener receiver component enables the housing to be configured in an at least substantially open configuration.

16. The relief apparatus of claim 8, further comprising a fastener interface element secured relative to the housing and configured to engage at least a portion of the activation assembly so as to at least partially define a range of relative motion between the fastener receiver component and the housing.

17. The relief apparatus of claim 16, wherein the fastener interface element comprises a protrusion feature extending in an outward direction from an exterior surface of the housing; wherein the protrusion feature comprises an orifice extending therethrough and configured to receive at least a portion of the fastener receiver component therein such that the fastener receiver component extends within the orifice of the protrusion feature from a first side of the fastener interface element to a second side of the fastener interface element.

18. The relief apparatus of claim 1, further comprising an activation assistance element operatively engaged with at least a portion of the housing and configured to apply one or more forces to the at least a portion of the housing engaged therewith so as to define a baseline housing configuration wherein the housing is predisposed to be arranged in an open configuration based at least in part on the one or more forces applied to the housing by the activation assistance element.

19. The relief apparatus of claim 1, further comprising one or more adjustable elements disposed along a length of the relief step device and configured to facilitate a selective adjustment of the length of the relief step device in response to the fall occurrence.

* * * * *